United States Patent [19]

Hirasawa

[11] Patent Number: 5,424,776
[45] Date of Patent: Jun. 13, 1995

[54] LENS CONTROL DEVICE FOR PERFOMING FOCUSING DURING LENS INITIALIZATION

[75] Inventor: Masahide Hirasawa, Sagamihara, Japan
[73] Assignee: Canon Kabushiki Kaisha, Tokyo, Japan
[21] Appl. No.: 88,249
[22] Filed: Jul. 7, 1993
[30] Foreign Application Priority Data Jul. 9, 1992 [JP] Japan .................................. 4-182451

[51] Int. Cl.[6] ............................................ H04N 5/232
[52] U.S. Cl. ...................................... 348/345; 348/347; 354/402
[58] Field of Search ............... 348/345, 347, 356, 358; 354/402; 359/676, 677, 684; H04N 5/232

[56] References Cited

U.S. PATENT DOCUMENTS 5,036,348  7/1991  Kusaka .................................. 354/402
5,144,491  9/1992  Ushiro et al. ..................... 348/347 X

FOREIGN PATENT DOCUMENTS 3119872  5/1991  Japan ........................... H04N 5/232

Primary Examiner—Michael T. Razavi
Assistant Examiner—Wendy R. Greening
Attorney, Agent, or Firm—Robin, Blecker, Daley & Driscoll

[57] ABSTRACT

A lens control device for performing focusing during lens initialization includes an axially movable focusing lens, a lens position detector for detecting the position of the lens and a detector for detecting a focus state of the lens on an image pickup plane. The lens control device further includes an initializing circuit which effects an initialization of the lens position detector, a memory circuit which stores the position of the lens at the detection of a focused state on the image pickup plane by the detector during the functioning of the initializing circuit and a control circuit which moves the lens to the position stored in the memory circuit at the completion of the initialization.

19 Claims, 10 Drawing Sheets

LENS CONTROL DEVICE FOR PERFOMING FOCUSING DURING LENS INITIALIZATION

BACKGROUND OF THE INVENTION

1. Field of the Invention

The present invention relates to lens control adapted for use in a lens of inner focus type.

2. Related Background Art

Figure 1:
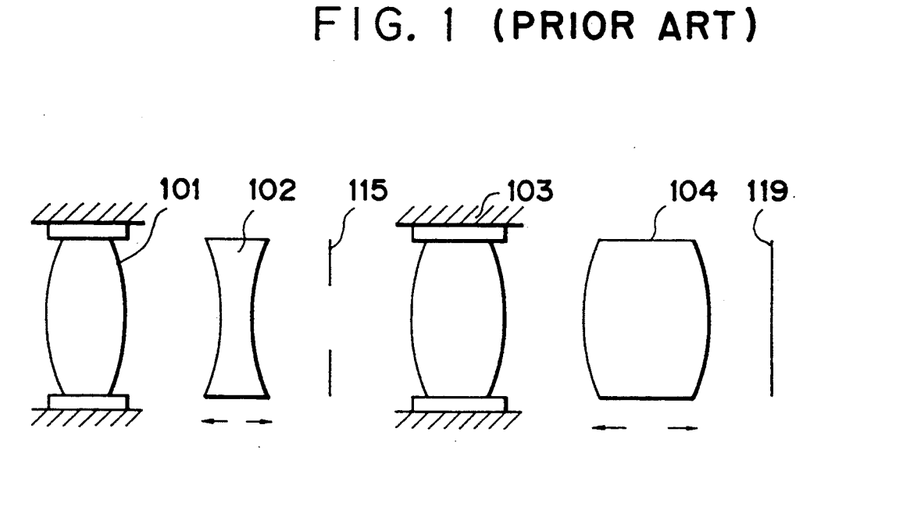
FIG. 1 is a view of the configuration of an inner focusing lens.

FIG. 1 illustrates a generally employed simple structure of an inner focus type lens system. There are provided a fixed first lens group 101; a second lens group 102 for zooming (hereinafter called zooming lens); a diaphragm 115; a fixed third lens group 103; a fourth lens group 104 having focusing function and so-called compensating function for compensating the displacement of the focal plane resulting from zooming (hereinafter called focus/compensating lens); and an image pickup plane 119 of an image pickup device.

In the lens system as shown in FIG. 1, as already known, the position of the focus/compensating lens 104 for focusing on the image pickup plane 119 varies depending on the distance to the object, even for a given focal length, because the lens 104 serves for both functions of focusing and compensation.

Figure 2:
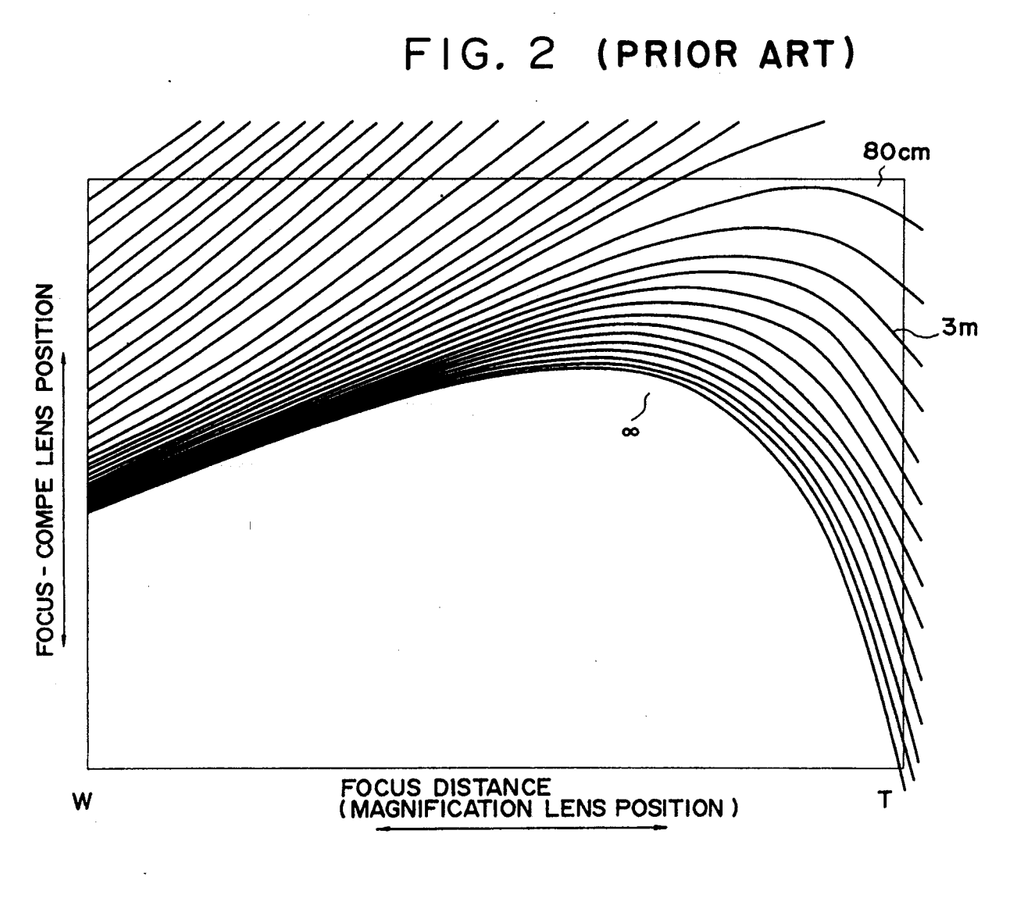
FIG. 2 is a chart showing the relationship between the zooming lens and the focusing lens in an inner focusing lens.

FIG. 2 shows the continuous plotting of the position of the focus/compensation lens 104 for focusing to the image pickup plane, when the object distance is varied at each focal length. In FIG. 2, the abscissa indicates the position of the zooming lens or the focal length, while the ordinate indicates the position of the focus/compensating lens, and the curves are focusing trajectories corresponding respectively to different object distances. A zooming operation without image blur can be achieved by selecting one of the plural trajectories shown in FIG. 2, corresponding to the object distance, and by moving the focus/compensating lens 104 according to thus selected trajectory.

A lens system of the front lens focusing type contains a compensating lens independent from the zooming lens, and both lenses are mutually linked by a mechanical cam. In case of manually varying the focal length by a manual zooming knob attached to a ring of said cam, the cam ring is rotated, following any movement of said knob, and the zooming lens and the compensating lens move along the cam grooves of said cam ring. Consequently, as long as the focusing lens is properly positioned, the above-mentioned operation does not generate image blur.

On the other hand, in the lens system of the inner focus type explained above, the control is generally executed by storing the plural trajectories shown in FIG. 2 in a certain form in a lens controlling microcomputer, then selecting one of said plural trajectories according to the positions of the focusing lens and the zooming lens, and effecting the zooming operation, tracking thus selected trajectory.

In such lens control, the positions of the lenses have to be read with a certain high level of precision, because the position of the focusing lens with respect to the position of the zooming lens is read from a memory device and is utilized for the lens control. As will be apparent from FIG. 2, when the zooming lens moves with a constant or nearly constant speed, the inclination of the trajectory of the focusing lens varies depending on the focal length. This means that the speed and direction of movement of the focusing lens varies continuously. Thus, if a stepping motor is employed in the actuator for the focusing lens, there is required a highly precise response over a range from one to several hundred cycles per second.

In the lens system of such inner focus type, a stepping motor is being commonly employed as the actuator for the focusing lens group, in order to meet the above-mentioned requirement. The stepping motor rotates in complete synchronization with the stepping pulses released, for example, from a lens controlling microcomputer with a constant stepping angle per pulse, and is capable of providing a high speed response, a high stopping precision and a high positional precision.

Also since the rotation angle of the stepping motor can be given by the number of stepping pulses, the pulses can be directly used as an incremental position encoder, and no additional position encoder is therefore required.

In such configuration, however, since the position is to be detected by the stepping motor itself, the stepping pulse counter has to be reset to a specified count prior to the position detection. If the count of said counter is incorrect, a proper trajectory cannot be read from the memory corresponding to the combined coordinates of the positions of the zooming lens and the focusing lens, and an image blur results since a proper trajectory tracking cannot be attained during the zooming operation.

Said resetting operation is usually executed by moving the focusing lens to a predetermined position immediately after the start of power supply but before the start of normal operation, and then setting the counter to a predetermined value. It is to be noted, in such operation, that the focusing lens starts to move from a position at which the power supply is started. Consequently, if the photographer turns off the power supply in order to avoid the consumption of the battery after adjusting the focus and the image angle and turns on the power supply again afterwards, there may result a situation that the lens is no longer in the previously adjusted position, or, even if the focusing lens is returned to the previous position, the position does not necessarily correspond to the distance of the object which the photographer wishes to take. Also if said resetting position is significantly different from the position of the focusing lens corresponding to the frequently used object distance, a significantly blurred image will be displayed for a while after the start of normal operation, unless a certain measure is taken for the returning of the focusing lens after the resetting operation. Furthermore, if the display is muted until the image blur is compensated to a certain level for example by the automatic focusing function, there will be required a long time until the normal operation is enabled, after the start of the power supply.

SUMMARY OF THE INVENTION

In consideration of the foregoing, a first object of the present invention is to provide a lens control device capable of a zooming operation without image blur, from the start of the operation.

A second object of the present invention is to provide a lens control device capable of effecting an initializing operation for focusing in prompt and accurate manner and effecting an auto focusing operation and a zooming operation without image blur, immediately after the initializing operation.

The above-mentioned objects can be attained, according to a preferred embodiment of the present invention, by a lens control device comprising a lens group movable along the optical axis; lens position detecting means for detecting the position of the lens group; initializing means for initializing the lens position detecting means by moving the lens group; detection means for detecting the focus state of the lens group on an image pickup plane; memory means for storing the position of the lens group when the detection means detects the focused state on the image pickup plane during the function of the initializing means; and control means for moving the lens group to a position stored in the memory means at the end of said initialization.

Also according to another preferred embodiment of the present invention, there is disclosed a lens control device comprising a lens; lens position detecting means for detecting the position of the lens; initializing means for initializing the lens position detecting means by moving the lens; detection means for detecting the focus state of said lens on an image pickup plane; memory means for storing the position of the lens when the detection means detects the focused state on the image pickup plane during the function of the initializing means; and control means for moving the lens to the position stored in the memory means at the end of said initializing in case the detection means detects the focused state during the function of said initializing means but returning the lens to a position prior to the initialization at the end of the initialization in case the focused state is not obtained.

Also according to still another preferred embodiment of the present invention, there is provided a configuration which employs a stepping motor for driving the focusing lens, detects the position of the focusing lens by counting the driving pulses therefor, memorizes the position of the focusing lens immediately after the start of power supply but before the start of the resetting operation and the position of the focusing lens where the focus voltage, detected by a focus voltage detecting device, becomes maximum in the course of a lens movement relating to the resetting operation, and, if the peak of the focus voltage is detected, returns the focusing lens to the position of detection of the focus voltage based on the latter memorized information after the focusing lens reaches a reset switch thereby resetting said counter, but, if the peak of the focus voltage cannot be detected by the focus voltage detecting devices, returns the focusing lens to the position prior to the resetting operation based on the former memorized information, thereby enabling lens control without image blur from immediately after the start of power supply, thus realizing highly precise zooming and focusing operations without errors, and without error in the lens position by the on/off operations of the power supply.

DETAILED DESCRIPTION OF THE PREFERRED EMBODIMENTS

Now the lens control device of the present invention will be clarified by a preferred embodiment thereof, with reference to the attached drawings.

Figure 3:
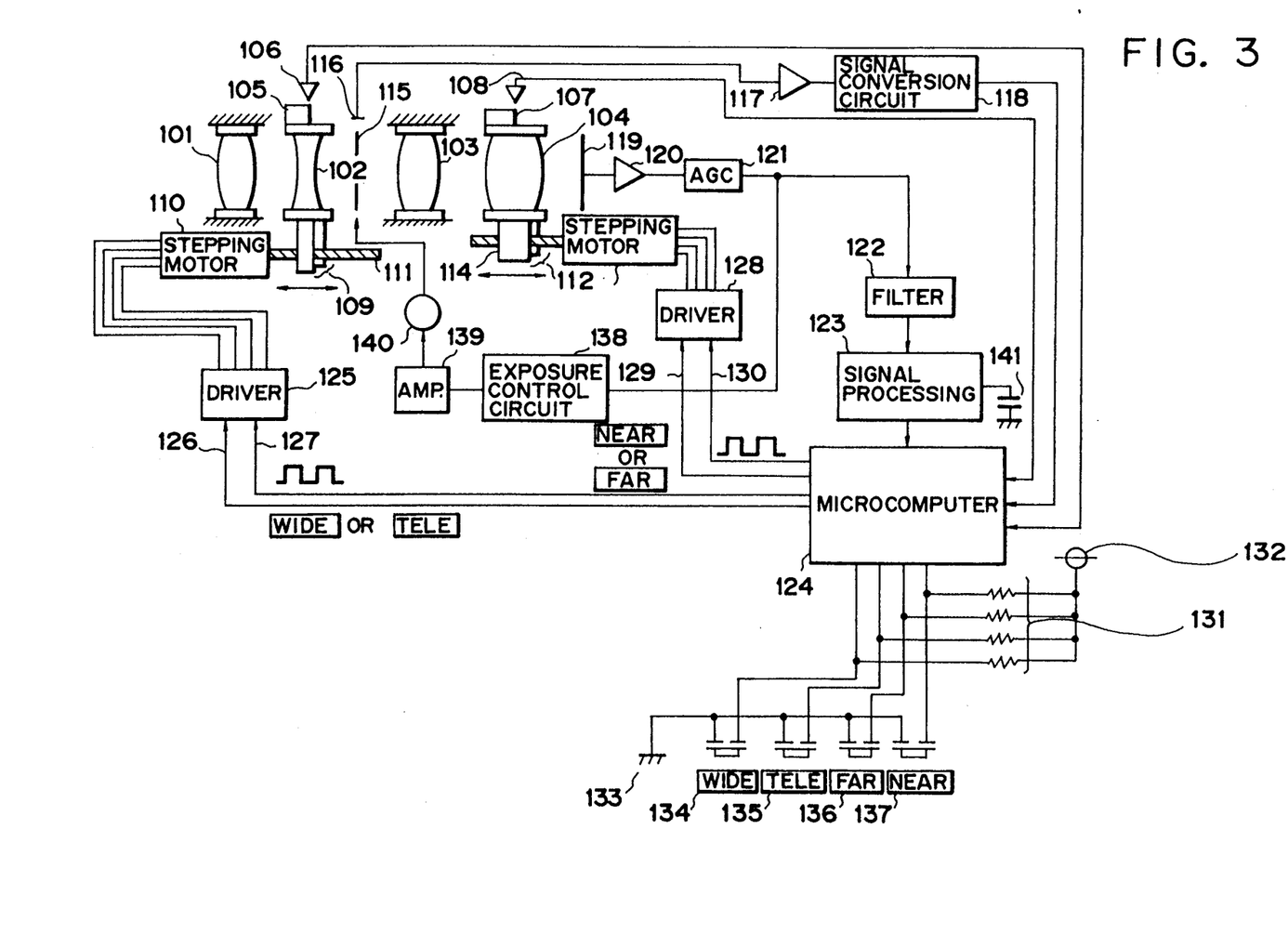
FIG. 3 is a block diagram of an embodiment of the lens control device of the present invention.

FIG. 3 is a block diagram of an embodiment, featuring the present invention.

In FIG. 3, 101, 102, 115, 103 and 104 are elements constituting a lens system of inner focusing type, and are respectively a fixed front lens group, a second lens group for zooming (zooming lens), a diaphragm, a fixed third lens group, and a fourth lens group serving for compensation and focusing (focus/compensating lens). Switches 105, 107 for detecting that the lenses 102, 104 are respectively in reference positions, are incorporated in the lens, in combination with photosensors 106, 108. Said switches 105, 107 are respectively fixed on the lenses 102, 104 and axially move integrally therewith. In the movable range of each lens, said switch intercepts the output light of the photosensor at an approximately middle position, and a photodetector of the photosensor releases a signal 1 or 0 respectively according to whether the output light is intercepted or not. Thus it can be detected whether the lens is located at the reference position where the signal changes. There are further provided an image pickup device 119 such as a CCD; a diaphragm encoder 116 for detecting the state of the diaphragm; an amplifier or an impedance converter 120 for amplifying the output signal of the image pickup device; a known AGC circuit 121; a band-pass filter 122 for extracting the high frequency components varying according to the focus state in the image signal; a signal processing circuit 123 for detecting the focus state by processing the high frequency components released from the band-pass filter 122; a peak-hold capacitor 141 for detecting the focused position by detecting the peak of the high frequency components; a controlling microcomputer 124 for controlling the lens driving; an amplifier 117 for amplifying the output signal of a photosensor 116; a signal converting circuit 118 for converting the output signal of the amplifier 117 into a signal readable by the microcomputer 124; an exposure control circuit 138 for detecting the level of output signal of the AGC circuit 121 and regulating the diaphragm 115 so as to maintain said level at a constant value; an amplifier 130 for amplifying the output signal of the exposure control circuit 138; a driver 140 for driving the diaphragm 115; drivers 125, 128 for sending driving energizes to stepping motors for respectively driving the zooming lens and the focus/compensating lens according to driving commands for the lenses, supplied from the microcomputer 124; stepping motors 110, 113 for respectively driving the zooming lens and the focus/compensating lens; output shafts 111, 114 constituting lead screws directly connected to the stepping motors; racks 109, 112 respectively engaging with the output shafts 111, 114 and moving axially by the rotation of the shafts, thereby causing movements of the lenses fixed to the racks; pull-up resistors 131; a power source 132; switches 134, 135 for moving the zooming lens 102 respectively in the wide angle direction and in the telephoto direction; and switches 136, 137 for moving the lens 104 respectively toward a position focused to the infinite object distance or toward a position focused to the shortest object distance.

When a zooming operation is executed in a lens system of inner focusing type as shown in FIG. 3, the focused position of the focus/compensating lens 104 varies as a function of the focal length as shown in FIG. 2, for different object distances. Stated differently, if the zooming operation is to be executed while maintaining the focused state, it is necessary to store the trajectory information shown in FIG. 2 in a certain form (in the trajectory itself or in a function containing the lens position as a variable) for example in the lens controlling microcomputer 124, then to read the trajectory information according to the position of the zooming lens or the moving speed thereof, and to move the focusing lens according to said information.

Figure 4:
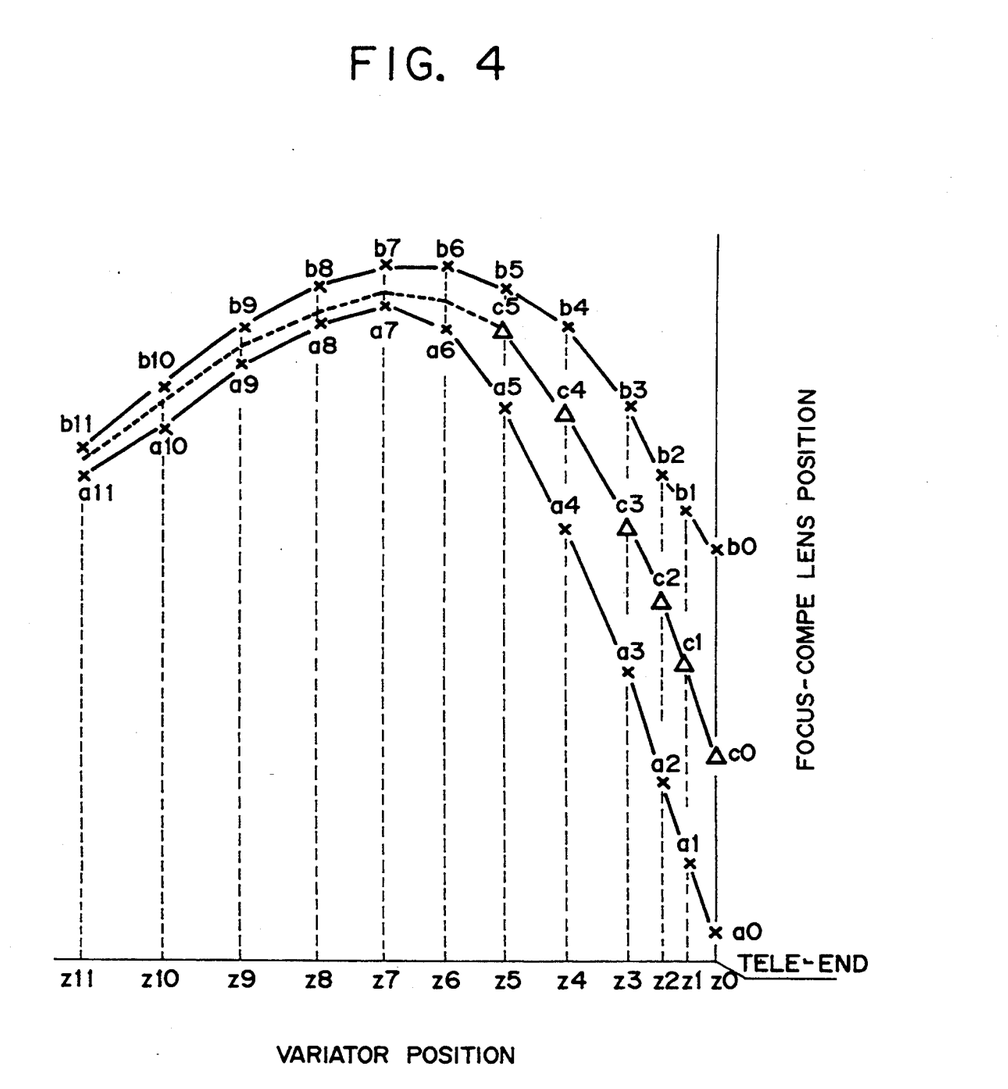
FIG. 4 is a chart showing the information memory state of the positional relationship of the zooming lens and the focusing lens.

FIG. 4 is a chart for explaining an example of the method for tracking said trajectory in the present invention.

In FIG. 4, a0, a1, a2, ..., a11 and b0, b1, b2, ..., b11 indicate representative trajectories memorized in the microcomputer, while c1, c2, ..., c11 indicate a trajectory, calculated from those mentioned above, according to the following equation:

$$c(n+1) = |c(n) - a(n)|/|b(n) - a(n)| * |b(n+1) - a(n+1)| + a(n+1) \quad (1)$$

According to the equation (1), if the focusing lens is at c0 in FIG. 4, there is determined the internal division ratio of the portion b0-a0 by the point c0, and the point c1 is determined by internally dividing the portion b1-a1 according to said ratio.

In the above-mentioned method of trajectory tracking, the precision of tracking is apparently affected directly by the precision of detection of the positions of the zooming lens and the focusing lens. It is therefore necessary, before entering the actual operation, to precisely reset the increment counter for lens position detection, corresponding to the reset position of the lens.

Figure 5:
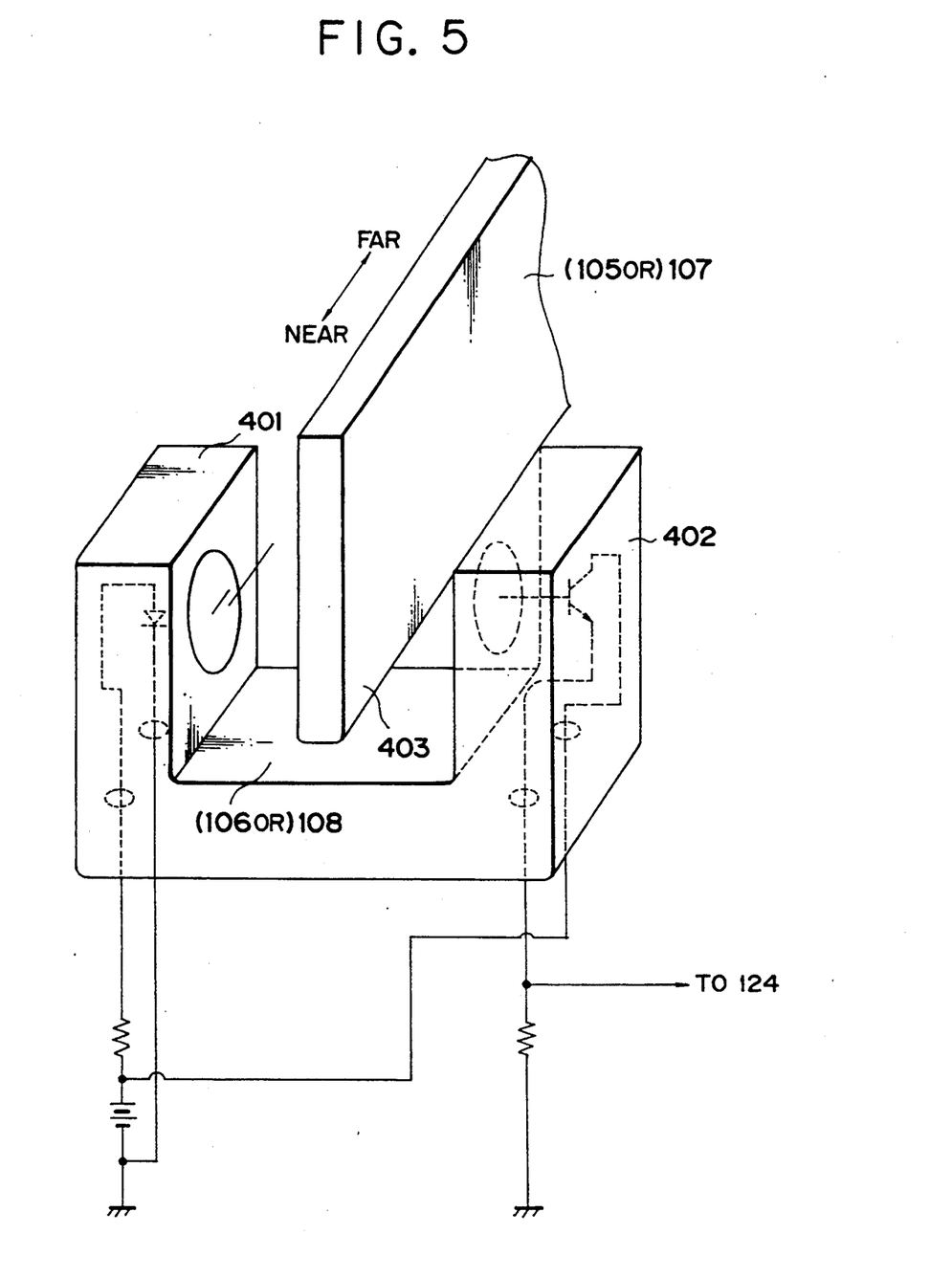
FIG. 5 is a perspective view showing the configuration of a sensor for lens position detection.

FIG. 5 is a detailed view of a resetting switch consisting of a combination of a photosensor and a shield plate, wherein provided are a light emitting unit 401, and a light receiving unit 402. A shield plate 403 follows the axial movement of the lens, and the output signal of the light receiving unit 402 assumes a low level or a high level respectively when the light path from 401 to 402 is intercepted or not by the shield plate.

Figure 6A:
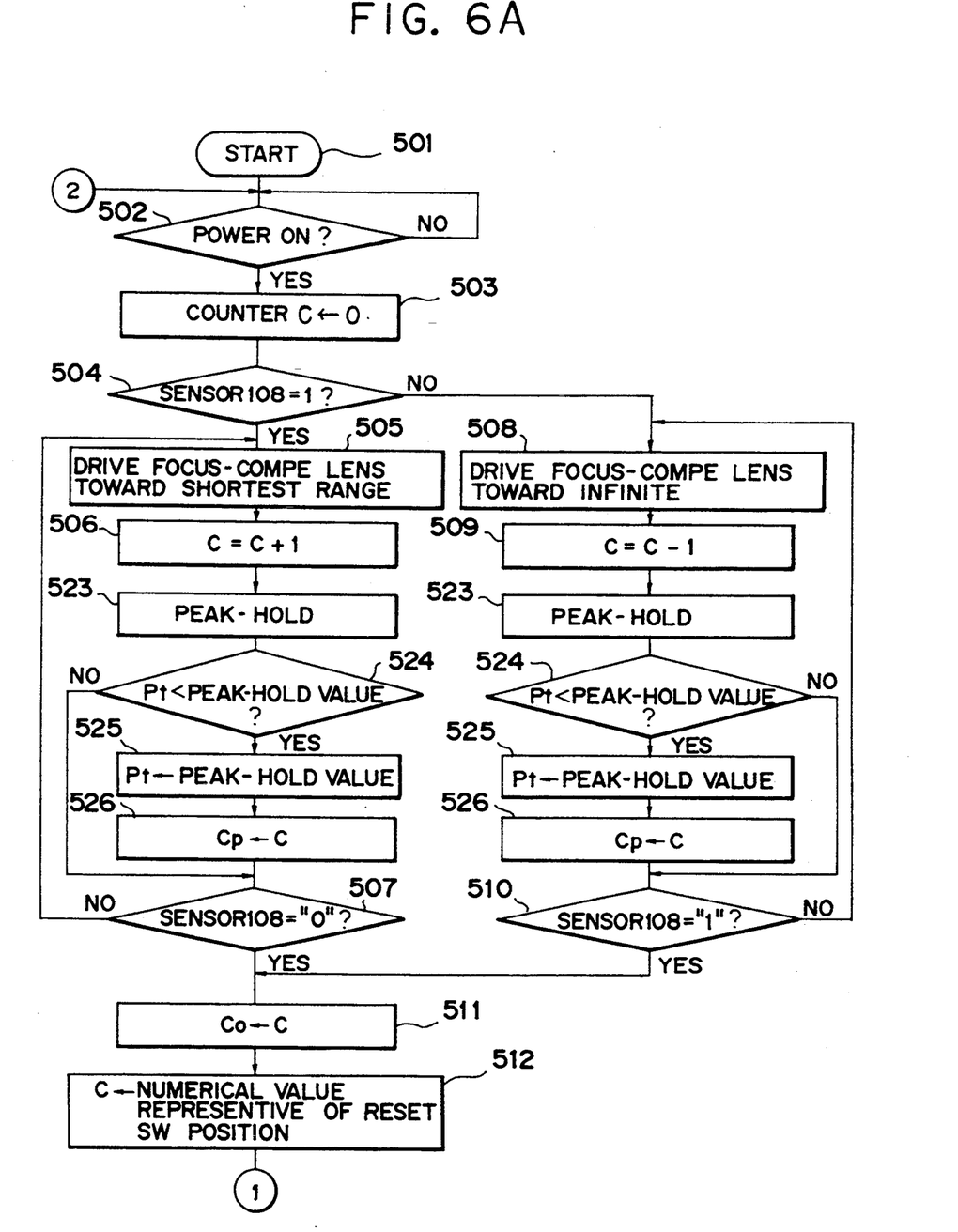
FIGS. 6A and 6B are flow charts showing the zooming control sequence of the present invention.
Figure 6B:
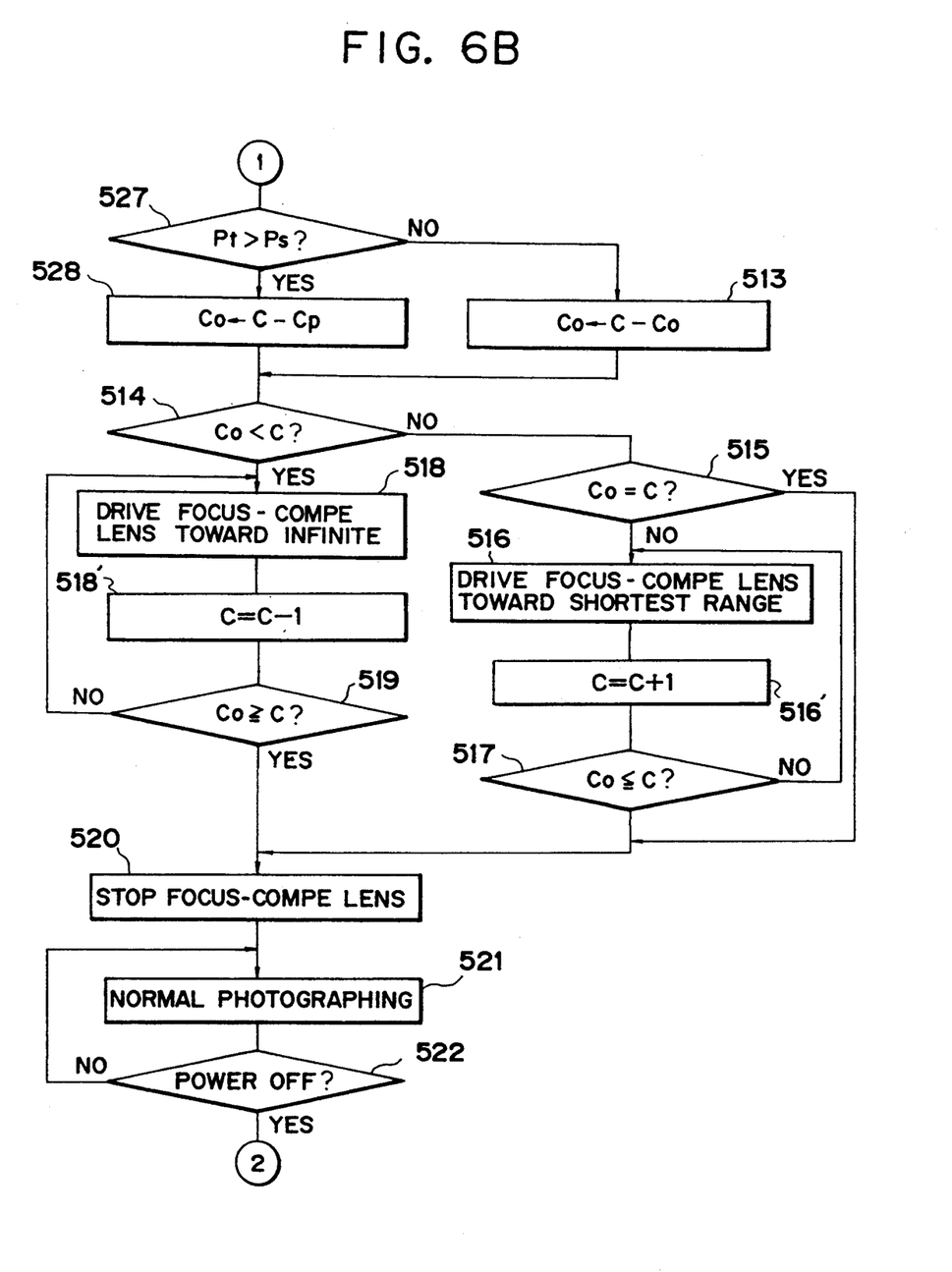

A flow chart shown in FIG. 6 explains a method of resetting operation of the lens position counter by means of said sensor. Though FIG. 6 explains the resetting of the focus/compensating lens 104, this method is also applicable in the identical manner to the resetting of the zooming lens 102.

When the routine execution is started in a step 501, a step 502 discriminates whether the power supply is turned on, and, if not, the sequence enters a waiting state. When the power supply is turned on, a step 503 clears a position detecting counter C for the focus/compensating lens 104 in the microcomputer 124 to zero, and a step 504 confirms whether the output of the position detecting sensor 108 for the focus/compensating lens is at the high level. If the boundary between the light transmitted state and the light intercepted state is at about the middle of the movable range of the lens, the output signal of the sensor 108 allows to identify whether the current lens position is, with respect to said boundary, at the side corresponding to the infinite object distance or at the side corresponding to the shortest object distance. In an example shown in FIG. 5, if the output signal of the sensor 108 is at the low level state, indicating the light intercepted state, the lens is positioned at the side corresponding to the shortest object distance with respect to said boundary, and the output signal can be shifted to the high level "1" state by a lens movement toward the side corresponding to the infinite object distance. The situation is inversed if the output is initially at the high level state. Thus, if a step 504 identifies the output signals of the sensor 108 at the high level "1", a step 505 moves the focus/compensating lens 104 toward the point focused to the shortest object distance, in order to reach said boundary position. Also a step 506 effects a stepwise increment of the position detection counter C for the focus/compensating lens, in synchronization with the stepping pulse for the stepping motor.

Then a step 523 fetches the peak, held by the capacitor 141, of the focus voltage or the level of the high frequency components released from the band pass filter 122 shown in FIG. 3 into the microcomputer 124, and the peak value is compared with a peak-hold value Pt in an immediately preceding cycle or in a predetermined previous cycle. If the current peak-hold value is larger than the preceding peak-hold value Pt, a step 525 renews the memorized content by substituting Pt with the current peak-hold value, and then a step 526 stores the value of the counter C as a variable Cp.

Then a step 507 discriminates whether the output signal of the sensor 108 has changed to the low level "0", and, if not, the sequence returns to the step 505 for repeating the above-explained procedure. On the other hand, if the step 507 identifies that the output signal has changed to the low level, the sequence proceeds to a step 511. In case the step 504 identifies that the output signal of the sensor 108 is at the low level, steps 508, 509 and 510 execute operations and identification inverse to those of the steps 505, 506 and 507. Then the steps 523, 524, 525 and 526 are executed in the same manner as explained in the foregoing, and, after the step 510 confirms the change of the output signal of the sensor 108, the sequence proceeds to the step 511.

When the sequence proceeds to the step 511, the value of the counter C indicates the number of stepping pulses between the position of the focus/compensating lens immediately after the start of power supply and before the resetting operation, and the position of the resetting switch, and the value thus indicates the distance between the initial position of the focus/compensating lens and the position of the resetting switch. Thus the step temporarily stores the value of the counter C in this state in a memory C0.

A next step 512 enters, into the counter C, a number indicating the predetermined position of the resetting switch (for example a resetting position, measured from an original point defined by optical designing within the movable range of the focusing lens, converted into the number of stepping pulses of the stepping motor). At the completion of the step 512, the resetting of the lens position detecting counter C is completed.

Then a step 527 discriminates whether the value Pt is larger than a predetermined value Ps. The discrimination is required for the following reason to be explained in relation to FIG. 7.

Figure 7:
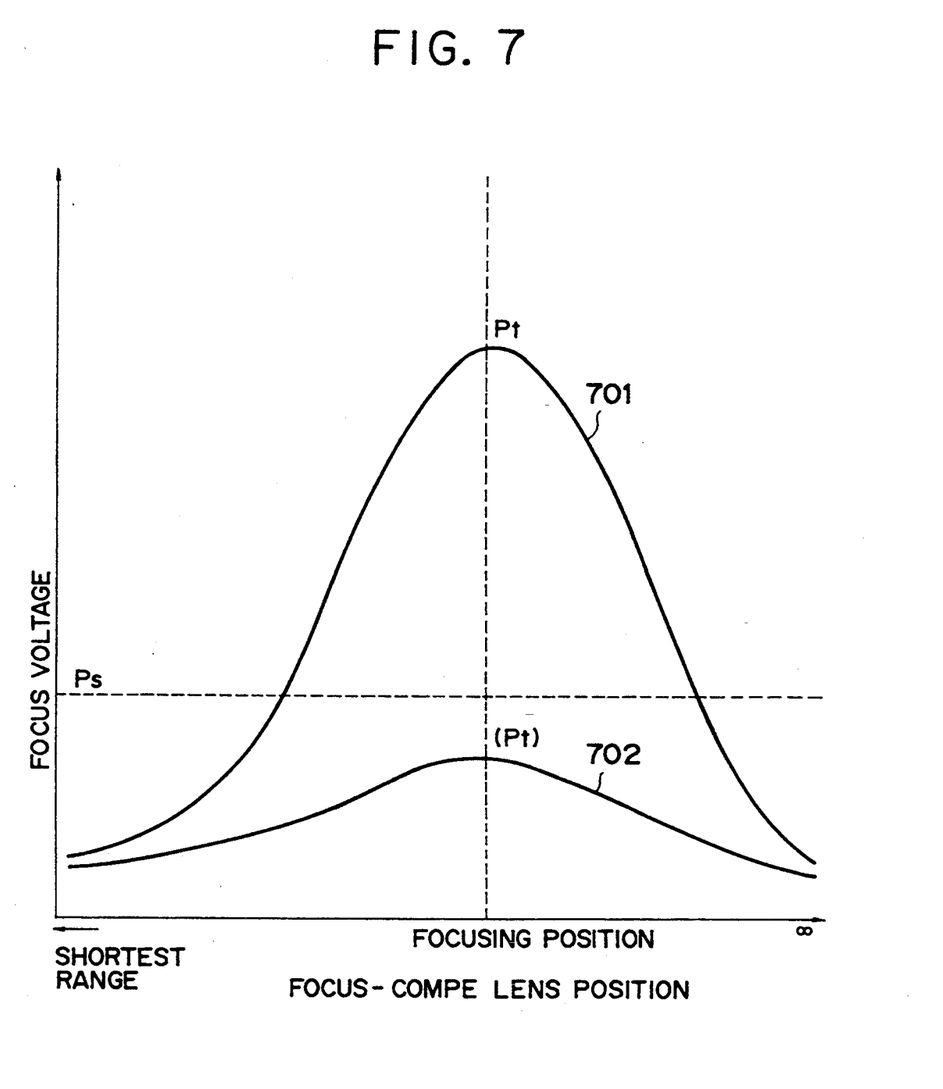
FIG. 7 is a chart showing the relationship between the position of the focus/compensating lens and the focus voltage.

FIG. 7 shows the variation of the focus voltage as a function of the position of the focus/compensating lens, wherein a curve 701 shows the variation of the focus voltage when there is taken an object allowing discrimination between the in-focus state and the out-of-focus state, while a curve 702 shows the variation of the focus voltage for an object with a low contrast and a low illumination intensity, for which the focus voltage is low in the variation as well as in the absolute value, so that the in-focus position cannot be identified.

In order to bring the focus/compensating lens to the in-focus position, it is necessary to securely identify said in-focus position, and, if such in-focus position is difficult to identify, it is often more reasonable to return the lens to the position immediately before the resetting operation.

Thus the step 527 discriminates whether a focus voltage enough for identifying the in-focus position, and, if not, a step 513 sets a value, obtained by subtracting the value $C_0$ corresponding to the original lens position from the newly determined value of the counter C, newly as $C_0$. Then, if Pt is at a sufficient level, a step 528 sets a value, obtained by subtracting a lens position Cp at the maximum value thereof from C, newly as $C_0$.

In this manner the step 513 (or 528) determines the absolute position of the focus/compensating lens in the initial state (or where the focus voltage reaches a peak) taking the resetting position measured from an original point (by subtracting the distance between the resetting switch and the initial position of the focus/compensating lens (or the position of the focus/compensating lens where the focus voltage reaches a peak)) and sets said absolute position as $C_0$. Thus the lens can be returned to the original position by a movement until the value of the counter C reaches $C_0$.

In case the sequence of the present embodiment passes the steps 508, 509 and 510, the value $C_0$ in the step 511 assumes a negative value. When this is substituted in the equation in the step 513, there is obtained a result larger than C in the step 512, namely a $-(-b)=a+b>0$, but such result merely signifies that the lens is initially positioned at the side corresponding to the shortest object distance, with respect to the resetting switch and there is no actual problem.

The initial lens position is thus determined, and the sequence proceeds to a step 514.

A sequence starting with the step 514 moves the focus/compensating lens 104 to the position prior to the resetting operation. The step 514 discriminates whether the position $C_0$ prior to the resetting operation is either at the side corresponding to the shortest object distance or at the side corresponding to the infinite object distance, with respect to the reset switch position at which the focus/compensating lens is currently stopped (in this state the value of the counter C corresponds to the resetting switch position). If $C_0$ is smaller than C, indicating that the original lens position is at the side corresponding to the infinite object distance with respect to the resetting switch, a step 518 moves the focus/compensating lens to the side corresponding to the infinite object distance. And a step 518' effects a stepwise increment of the value of the counter C. Then, if a step 519 identifies that the value of the counter becomes equal to or smaller than $C_0$, a step 520 stops the focus/compensating lens. If the value of the counter does not reach $C_0$, the sequence returns to the step 518 for repeating the same procedure. On the other hand, in case the step 514 does not identify that the original position of the focus/compensating lens is at the side corresponding to the infinite object distance with respect to the resetting position, a step 515 discriminates whether the original lens position is equal to the resetting switch position. If equal, the focus/compensating lens need not be moved, so that the sequence proceeds to a step 520. If the original position is identified to be at the side corresponding to the shortest object distance with respect to the resetting switch, a step 516 moves the focus/compensating lens toward the side corresponding to the shortest object distance, and a step 516' effects a stepwise decrement of the value of the counter C, then a step 517 discriminates whether the original position is reached, and, if reached, a step 520 stops the focus/compensating lens.

Since the lens returns to the original position prior to the resetting operation, upon being stopped in the step 520, a step 521 executes an ordinary phototaking operation. When a step 522 confirms that the power supply is cut off after the phototaking operation, the sequence returns to the step 502.

As explained in the foregoing, the present invention enables a prompt and secure resetting operation for the focusing lens, thereby allowing lens control without image blur from immediately after the start of power supply and also enables a zooming operation without error, even if the power supply is turned off and on during the use.

In the following there will be explained a second embodiment of the present invention, with reference to FIGS. 8 and 9, which show a method for more accurately obtaining the peak value of the focus voltage in the course of the resetting operation.

Figure 8:
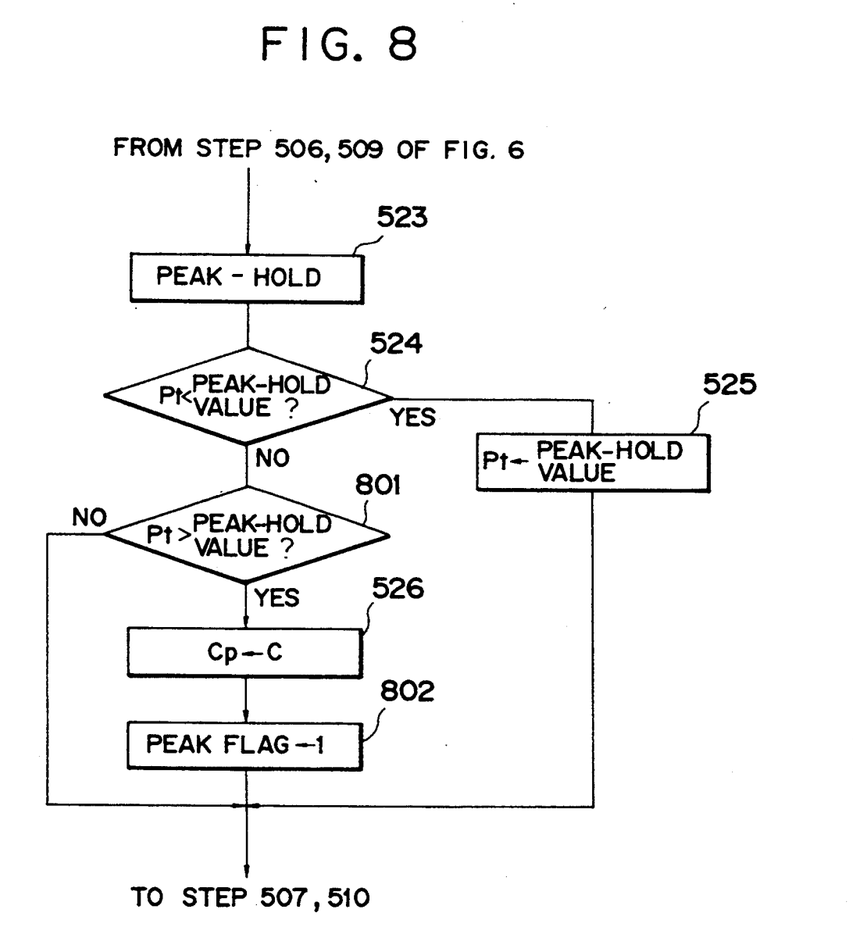
FIGS. 8 and 9 are flow charts for explaining a second embodiment of the present invention.

FIG. 8 is a flow chart showing the control sequence replacing the steps 523, 524, 525 and 526 in FIG. 6 and shows the modified portion as well as preceding and succeeding portions only. After the execution of the step 506 or 509, a step 523 effects peak holding, and a step 524 discriminates whether the peak-hold value is larger than Pt as in the first embodiment shown in FIGS. 6A and 6B. If identified larger, a step 525 sets the current peak-hold value as Pt, and the sequence proceeds to the step 507 or 510.

On the other hand, if the step 524 does not identify that the peak-hold value is larger than Pt, a step 801 discriminates whether the peak-hold value is smaller than Pt. If identified smaller, the focus/compensating lens has passed the peak position of the focus voltage in the curve shown in FIG. 7, so that a step 526 sets C as Cp, and a step 802 sets a peak flag, indicating the detection of the peak value during the resetting, at "1".

Figure 9:
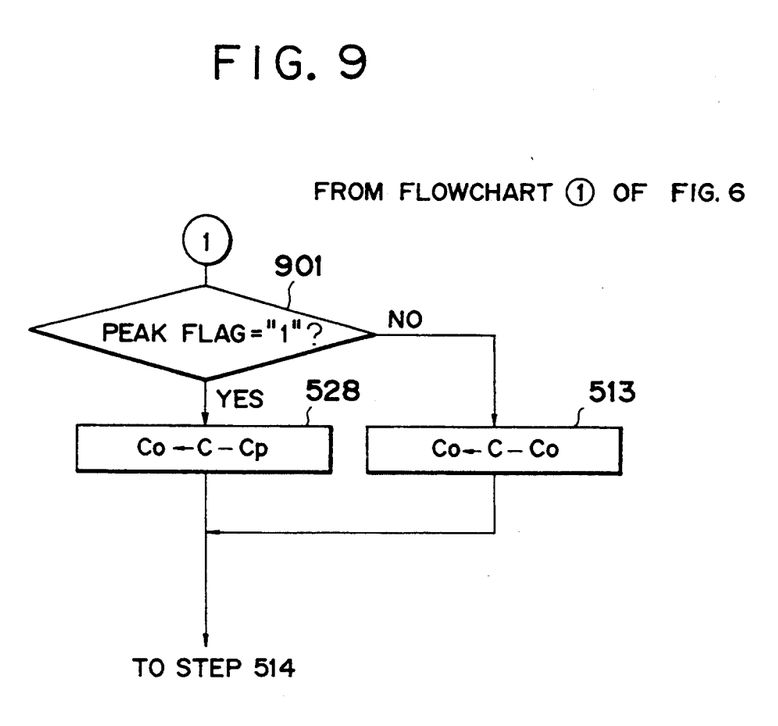

FIG. 9 is a flow chart of the control sequence replacing the steps 527, 528 and 513 in FIG. 5. If a step 901 confirms that the peak flag is "1", since the peak position is memorized as Cp, a step 528 sets the result of C−Cp as $C_0$ whereby the position of returning is taken as the peak position.

Also if the peak flag is "0", a step 513 sets the result of C−$C_0$ as $C_0$, thus setting the position of the focus/compensating lens prior to the resetting operation as the returning position therefor.

In the above-explained procedure, if the peak cannot be detected in satisfactory manner or if the focus voltage monotonously increases or decreases, the peak flag is not set, so that the focus/compensating lens is returned to the original position. The focus/compensating lens is moved to the peak position of the focus voltage only when the peak is satisfactorily detected, and the position of the focus/compensating lens can always be precisely controlled regardless of the status of the object to be taken.

In the foregoing embodiments, as explained above, there are employed a stepping motor as the lens actuator for the lens system of the inner focusing type, and an increment counter, wherein the lens, moved in the counter resetting operation before entering the normal state of use, is returned, after the resetting operation, to an in-focus position detected during the resetting operation, or to the original position before the movement if such in-focus position cannot be detected. Thus, when the user wishes to turn off the power supply while maintaining the lens position, the actual control enables the initiation of the phototaking operation promptly, reflecting said wish.

Also if the resetting switch is not in the ordinary lens position but in a position beyond the position corresponding to the infinite object distance or to the shortest object distance, there can be prevented the drawback that the phototaking operation is initiated with a significant image blur.

Also the foregoing embodiments provide the advantage of securely returning the lens to the original position without a particular memory or an external device, regardless of the value of the counter or the lens position prior to the resetting operation.

What is claimed is:

1. A lens control device comprising:
   a) a lens movable in parallel with an optical axis;
   b) lens position detecting means for detecting the position of said lens;
   c) initializing means for effecting initialization of said lens and said lens position detecting means, by moving said lens to a predetermined position and resetting said lens position detecting means;
   d) detection means for detecting a focus state of said lens on an image pickup plane;
   e) memory means for storing the position of said lens at a time when an in-focus state is detected by said detection means on said image pickup plane during the operation of said initializing means; and
   f) control means for moving said lens to the position stored in said memory means after the completion of said initialization.

2. A device according to claim 1, wherein said lens is a focusing lens.

3. A device according to claim 1, wherein said initializing means is adapted to move said lens to a predetermined reference position, and to reset said lens position detecting means when said reference position is detected by said lens position detecting means.

4. A device according to claim 3, wherein said lens is driven by a stepping motor, said lens position detecting means includes counter means for counting the driving pulses for said stepping motor and switch means for detecting the arrival of said lens at said reference position, and said initializing means is adapted to reset said counter means when said switch means detects the arrival of said lens at said reference position.

5. A device according to claim 1, wherein said detection means is adapted to extract high frequency components varying according to the focus state from an image signal and to detect the focus state according to the level of said components.

6. A device according to claim 1, wherein said lens position detecting means is adapted to detect the position of said lens, with respect to an initial position thereof prior to the execution of said initialization, and said control means includes selection means for selecting either an operation of moving said lens to said initial position or an operation of returning said lens to a position where said focused state is obtained.

7. A device according to claim 6, wherein said selection means is adapted to move said lens to the focused position thereof after the completion of said initialization in case said focused position of said lens is detected during the initialization of said initializing means, but to drive said lens to said initial position after the completion of said initialization in case said focused position is not detected.

8. A video camera comprising:
   a) a focusing lens;
   b) lens control means for controlling the position of said focusing lens;
   c) initializing means for effecting initialization of said focusing lens and said lens control means by moving said focusing lens to a predetermined position and resetting said lens control means;
   d) focus state detection means for detecting a focus state of said focusing lens;
   e) memory means for storing the position of said focusing lens at a time when an in-focus state of said focusing lens is detected by said focus state detection means during the initialization by said initializing means; and
   f) control means for moving said focusing lens to the position stored in said memory means at the completion of said initialization.

9. A video camera according to claim 8, wherein said initializing means is adapted to move said focusing lens to a predetermined reference position, and to reset focusing lens position detection means of said lens control means when said reference position is detected by position detection means.

10. A video camera according to claim 9, wherein said focusing lens is driven by a stepping motor, said focusing lens position detection means including counter means for counting the driving pulses for said stepping motor and switch means for detecting the arrival of said focusing lens at said reference position, and said initializing means is adapted to reset said counter means when the arrival of said focusing lens at said reference position is detected.

11. A video camera according to claim 8, wherein said focus state detection means is adapted to extract high frequency components varying according to the focus state from an image signal released from image pickup means and to detect the focus state according to the level of said components.

12. A video camera according to claim 8, wherein said focus state detection means is adapted to the position of said focusing lens with respect to an initial position thereof prior to the execution of said initialization, said control means includes selection means for selecting either an operation of moving said focusing lens to said initial position or an operation of returning said focusing lens to a position where said focused state is obtained, and said selection means is adapted to move the focusing lens to said focused position after the completion of said initialization in case the focused position of said focusing lens is detected during the initialization of said initializing means, but to drive said focusing lens to said initial position after the completion of said initialization in case the focused position is not detected.

13. A lens control device comprising:
a) a focusing lens;
b) lens position detection means for detecting the position of said focusing lens;
c) initializing means for effecting initialization of said focusing lens and said lens position detection means by moving said focusing lens to a predetermined position and resetting said lens position detection means;
d) focus state detection means for detecting a focus state of said focusing lens; and
e) control means for activating the focus state detection means during the initialization by said initializing means to detect an in-focus position of said focusing lens.

14. A device according to claim 13, wherein said initializing means is enabled in response to the start of power supply and moves said focusing lens to a predetermined reference position.

15. A device according to claim 14, wherein said control means is adapted to store the focused position in case said focused position is detected by said focus state detection means during the initialization of said focusing lens; and to move said focusing lens to said focused position after the completion of said initialization.

16. A device according to claim 15, wherein said control means is adapted to move said focusing lens to the position thereof prior to the initialization, after the completion of said initialization, in case the focused position is not detected by said focus state detection means during said initialization.

17. A lens control device comprising:
a) a focusing lens;
b) position detection means for detecting the position of said focusing lens;
c) initializing means for effecting initialization of said focusing lens and said position detection means by moving said focusing lens to a predetermined position and resetting said position detection means;
d) detection means for detecting a focus state of said focusing lens on an image pickup plane;
e) memory means for storing the position of said focusing lens at a time when an in-focus state on said image pickup plane is detected by said detection means during said initialization; and
f) control means for moving said focusing lens to the position stored in said memory means after the completion of said initialization in case the in-focus state is detected by said detection means during the function of said initializing means but returning said focusing lens to the position prior to said initialization after the completion of said initialization, in case said in-focus state cannot be obtained during said initialization.

18. A device according to claim 17, wherein said initializing means is adapted to move said focusing lens to a predetermined reference position, and to reset said position detection means when said reference position is detected by said position detection means.

19. A device according to claim 18, wherein said focusing is driven by a stepping motor, said lens position detection means includes counter means for counting the driving pulses for said stepping motor and switch means for detecting the arrival of said focusing lens at said reference position, and said initializing means is adapted to reset said counter means when said switch means detects the arrival of said focusing lens at said reference position.

* * * * *

UNITED STATES PATENT AND TRADEMARK OFFICE
CERTIFICATE OF CORRECTION

PATENT NO. : 5,424,776
DATED : June 13, 1995
INVENTOR(S) : Masahide Hirasawa

It is certified that error appears in the above-indentified patent and that said Letters Patent is hereby corrected as shown below:

Cover page, Item [54], line 1. Change "PERFOMING" to -- PERFORMING --.

Col. 1, line 2. Change "PERFOMING" to -- PERFORMING --.

Signed and Sealed this

Nineteenth Day of September, 1995

Attest:

BRUCE LEHMAN

*Attesting Officer*  *Commissioner of Patents and Trademarks*